United States Patent
Marks

(10) Patent No.: US 9,771,983 B2
(45) Date of Patent: Sep. 26, 2017

(54) COUPLING ASSEMBLY

(71) Applicant: Ryan Kenneth Marks, Franksville, WI (US)

(72) Inventor: Ryan Kenneth Marks, Franksville, WI (US)

(73) Assignee: Phoenix Sokoh Couplings, LLC, Menomenee Falls, WI (US)

( * ) Notice: Subject to any disclaimer, the term of this patent is extended or adjusted under 35 U.S.C. 154(b) by 28 days.

(21) Appl. No.: 14/846,363

(22) Filed: Sep. 4, 2015

(65) Prior Publication Data

US 2017/0067513 A1   Mar. 9, 2017

(51) Int. Cl.
    *F16D 3/78*     (2006.01)
    *F16D 1/033*     (2006.01)
    *F16B 37/12*     (2006.01)

(52) U.S. Cl.
CPC ............. *F16D 3/78* (2013.01); *F16B 37/122* (2013.01); *F16D 1/033* (2013.01); *Y10T 403/645* (2015.01)

(58) Field of Classification Search
CPC .......... F16D 1/033; F16D 3/78; F16B 37/122; Y10T 403/645
USPC ........................................ 464/93–96, 98, 99
See application file for complete search history.

(56) References Cited

U.S. PATENT DOCUMENTS

| | | | | |
|---|---|---|---|---|
| 1,314,990 A * | 9/1919 | Stockwell | ................. | F16D 3/78 464/99 X |
| 1,350,500 A * | 8/1920 | Hardy | ...................... | F16D 3/78 464/93 |
| 1,580,747 A * | 4/1926 | MacDonald | .............. | F16D 3/78 464/95 |
| 2,182,711 A | 12/1939 | Thomas | | |
| 2,499,093 A * | 2/1950 | Webb | ........................ | F16D 3/78 464/94 X |
| 2,712,741 A | 7/1955 | Roller | | |
| 2,846,857 A | 8/1958 | Hagenlocher | | |
| 3,405,760 A | 10/1968 | Smith | | |
| 3,422,637 A * | 1/1969 | Kelley | ...................... | F16D 3/78 464/93 |
| 3,500,658 A | 3/1970 | Goody | | |

(Continued)

FOREIGN PATENT DOCUMENTS

DE     28 55 356 A1 *   7/1979
DE     39 42 797 A1 *   7/1991

(Continued)

OTHER PUBLICATIONS

Universal Joint and Driveshaft Design Manual, AE-7, Section 3.1.5, Society of Automotive Engineers, Inc., Warerndale, PA, pp. 93-95, TJ1079.S62 1979.*

*Primary Examiner* — Gregory Binda
(74) *Attorney, Agent, or Firm* — Reinhart Boerner Van Deuren P.C.

(57) ABSTRACT

A coupling assembly includes a body member and at least one end member attached to the body member. At least one connection arrangement is situated between the body member and the at least one end member, respectively. The at least one connection arrangement includes a plurality of bushings. A plurality of fasteners are each respectively received by the plurality of bushings to fasten the body member to the at least one end member. Each one of the plurality of bushings are rotationally fixed about their center longitudinal axes by the at least one connection arrangement.

14 Claims, 5 Drawing Sheets

(56) References Cited

U.S. PATENT DOCUMENTS

| | | | |
|---|---|---|---|
| 3,500,659 A | * | 3/1970 | Martin .................... F16D 3/78 |
| | | | 464/93 |
| 3,654,775 A | | 4/1972 | Williams |
| 3,703,817 A | | 11/1972 | Orwin |
| 3,768,276 A | | 10/1973 | Caldwell et al. |
| 4,055,966 A | | 11/1977 | Fredericks |
| 4,073,161 A | | 2/1978 | Bury |
| 4,096,711 A | | 6/1978 | Carlson et al. |
| 4,182,434 A | * | 1/1980 | Munz .................... F04D 29/669 |
| | | | 464/94 X |
| 4,191,030 A | | 3/1980 | Calistrat |
| 4,353,704 A | | 10/1982 | Corey |
| 7,559,845 B2 | | 7/2009 | Corey |

FOREIGN PATENT DOCUMENTS

| | | | |
|---|---|---|---|
| GB | 352819 | * | 7/1931 |
| GB | 2477550 A | * | 8/2011 |
| IT | 406830 | * | 11/1946 |
| SU | 1257311 A1 | * | 9/1986 |

\* cited by examiner

COUPLING ASSEMBLY

FIELD OF THE INVENTION

This invention generally relates to couplings, and more particularly to mechanical couplings utilized to transfer a rotational torque

BACKGROUND OF THE INVENTION

For power transmission in the form of a torque from a motor, engine, turbine, or other power source to another device, such as a gear box, pump, generator, compressor or other device receiving the power, a coupling may be utilized. Such a coupling may be a single unitary component, such as a simple shaft, or an assembly of multiple components which are aligned along a common longitudinal axis. In either case, an input torque from the power source is transferred via the coupling to the gear box or other device.

In the context of a coupling assembly, each component thereof is typically a shaft element having a flange at one or both ends thereof for connection to other similarly shaped components of the assembly. The flange of each component typically has a hole pattern for receipt of a plurality of fasteners, which are typically bolts or the like. For each bolt, an associated nut is typically utilized as well. As a result, the flanges of adjacent components of the coupling assembly are interposed between a number of bolt heads and an associated nuts when fully assembled.

Unfortunately, the use of the nut for each fastener requires a relatively large amount of clearance to utilize a wrench or other device to hold the nut in place as the bolt is tightened. This large amount of clearance means that the overall outer diameter of the component which the nut seats against must be reduced to allow for said clearance. This reduction in diameter directly correlates to the maximum shaft size which a coupling can accommodate, which also directly impacts the torque density of the coupling assembly. Torque density is defined as the maximum torque capacity of the coupling assembly divided by the outermost diameter of the coupling assembly. As such, there is a need in the art for a coupling assembly with an improved connection arrangement utilized between adjacent components thereof to allow for a larger diameter of the components of the coupling assembly, which would lead to a larger bore diameter to coupling diameter ratio, as well as a greater torque density.

The invention provides such a coupling assembly. These and other advantages of the invention, as well as additional inventive features, will be apparent from the description of the invention provided herein.

BRIEF SUMMARY OF THE INVENTION

In one aspect, embodiments of the invention provide a coupling assembly that allows for an increase in the outer diameter thereof so as to provide a greater torque rating for the coupling assembly. An embodiment of such a coupling assembly includes a body member and at least one end member attached to the body member. At least one connection arrangement is situated between the body member and the at least one end member, respectively. The at least one connection arrangement comprises a plurality of bushings. A plurality of fasteners are respectively received by the plurality of bushings to fasten the body member to the at least one end member. Each one of the plurality of bushings are rotationally fixed about their center longitudinal axes by the at least one connection arrangement.

In certain embodiments, the at least one end member includes a first and a second end member. The at least one connection arrangement includes a first connection arrangement and a second connection arrangement. The first connection arrangement is interposed between the first end member and a first end of the body member. The second connection arrangement is interposed between the second end member and a second end of the body member.

Each of the first and second connection arrangements include a disc pack interposed between a pair of pilot rings. The disc pack includes a plurality of identical stacked flexible discs. Each one of the plurality of identical stacked flexible discs includes a hole pattern therein.

Each one of the pair of pilot rings includes a plurality of circular apertures and a plurality of non-circular apertures formed therein. The plurality of non-circular apertures of the pair of pilot rings respectively receives head portions of the plurality of bushings. The head portion of each of the plurality of bushings has a non-circular outer periphery. The head portion of each of the plurality of bushings is respectively received in the plurality of non-circular apertures to rotationally fix each bushing about its center longitudinal axis.

In certain embodiments, the body member includes a radially protruding flange and the at least one end member includes a radially protruding flange. The plurality of fasteners includes a first set and a second set. The first set and second set are opposed such that the first set seats against the body member flange and the second set seats against the at least one end member flange. A terminal end of each of the plurality of fasteners is disposed, respectively, within an interior passageway of each of the plurality of bushings.

In another aspect, embodiments of the invention provide a coupling assembly which allows for axial misalignment of its respective members to compensate for minor deviations in alignment between componentry connected by the coupling assembly. An embodiment of such a coupling assembly includes a body member. The body member includes a radially protruding flange. The coupling assembly also includes at least one end member attached to the body member. The at least one end member includes a radially protruding flange. A connection arrangement is situated between the body member and the at least one end member. A plurality of fasteners are respectively received by the connection arrangement to fasten the body member to the at least one end member. The plurality of fasteners includes a first set and a second set. The first set and the second set are opposed such that the first set seats against the body member flange and the second set seats against the at least one end member flange.

In certain embodiments, the at least one end member includes a first and a second end member. The at least one connection arrangement includes a first connection arrangement and a second connection arrangement. The first connection arrangement is interposed between the first end member and a first end of the body member. The second connection arrangement is interposed between the second end member and a second end of the body member.

Each of the first and second connection arrangements includes a disc pack interposed between a pair of pilot rings. The disc pack includes a plurality of identical stacked flexible discs. Each one of the plurality of identical stacked flexible discs includes a hole pattern therein. Each one of the pair of pilot rings includes a plurality of circular apertures and a plurality of non-circular apertures formed therein.

The plurality of non-circular apertures of the pair of pilot rings respectively receives head portions of a plurality of bushings of the connection arrangement. The head portion of each of the plurality of bushings has a non-circular outer periphery. The head portion of each of the plurality of bushings is respectively received in the plurality of non-circular apertures to rotationally fix each bushing about its center longitudinal axis. A terminal end of each of the plurality of fasteners is disposed, respectively, within an interior passageway of each of the plurality of bushings.

In yet another aspect, a method of assembling a coupling assembly is provided which presents a reduced tooling and labor effort. An embodiment of such a method includes providing a body member with a first end and a second end. The method also includes connecting a first end member to the first end. This step of connecting includes interposing a first connection arrangement between the first member and the first end of the body member. The first end member, first end of the body member, and the first connection arrangement define a first plurality of aligned passageways. This step of connecting also includes respectively positioning each one of a first plurality of fasteners within each one of the plurality of aligned passageways such that a terminal end of each one of the plurality of fasteners is disposed within its associated aligned passageway.

The method also includes connecting a second end member to the second end. This step of connecting includes interposing a second connection arrangement between the second end member and the second end of the body member. The second end member, second end of the body member, and the second connection arrangement define a second plurality of aligned passageways. This step of connecting also includes respectively positioning each one of a second plurality of fasteners within each one of the second plurality of aligned passageways such that a terminal end of each one of the second plurality of fasteners is disposed within its associated aligned passageway.

In certain embodiments, the step of connecting the first end member to the first end includes installing the first plurality of fasteners such that a first set of the first plurality of fasteners faces in an opposite direction as that of a second set of the first plurality of fasteners. The step of connecting the second end member to the second end includes installing the second plurality of fasteners such that a first set of the second plurality of fasteners faces in an opposite direction as that of a second set of the second plurality of fasteners.

In certain embodiments, the step of connecting the first end member to the first end includes installing the first plurality of fasteners within a first plurality of bushings which are rotationally fixed about their center longitudinal axes. The step of connecting the second end member to the second end includes installing the second plurality of fasteners within a second plurality of bushings which are rotationally fixed about their center longitudinal axes.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the accompanying drawings, FIGS. 1-5 illustrate an exemplary embodiment of a coupling assembly according to the teachings of the present invention. As will be understood from the following, the coupling assembly herein presents an improvement in the state of the art of coupling assemblies by allowing for a larger diameter of the components of the coupling assembly. As will be understood from the following, this larger diameter capability is achieved by utilizing fasteners which do not require a separate nut for fastening the same. Instead, a new and improved anti-rotational bushing system is utilized which allows for the omission of a nut that would otherwise be associated with each fastener.

Figure 1:
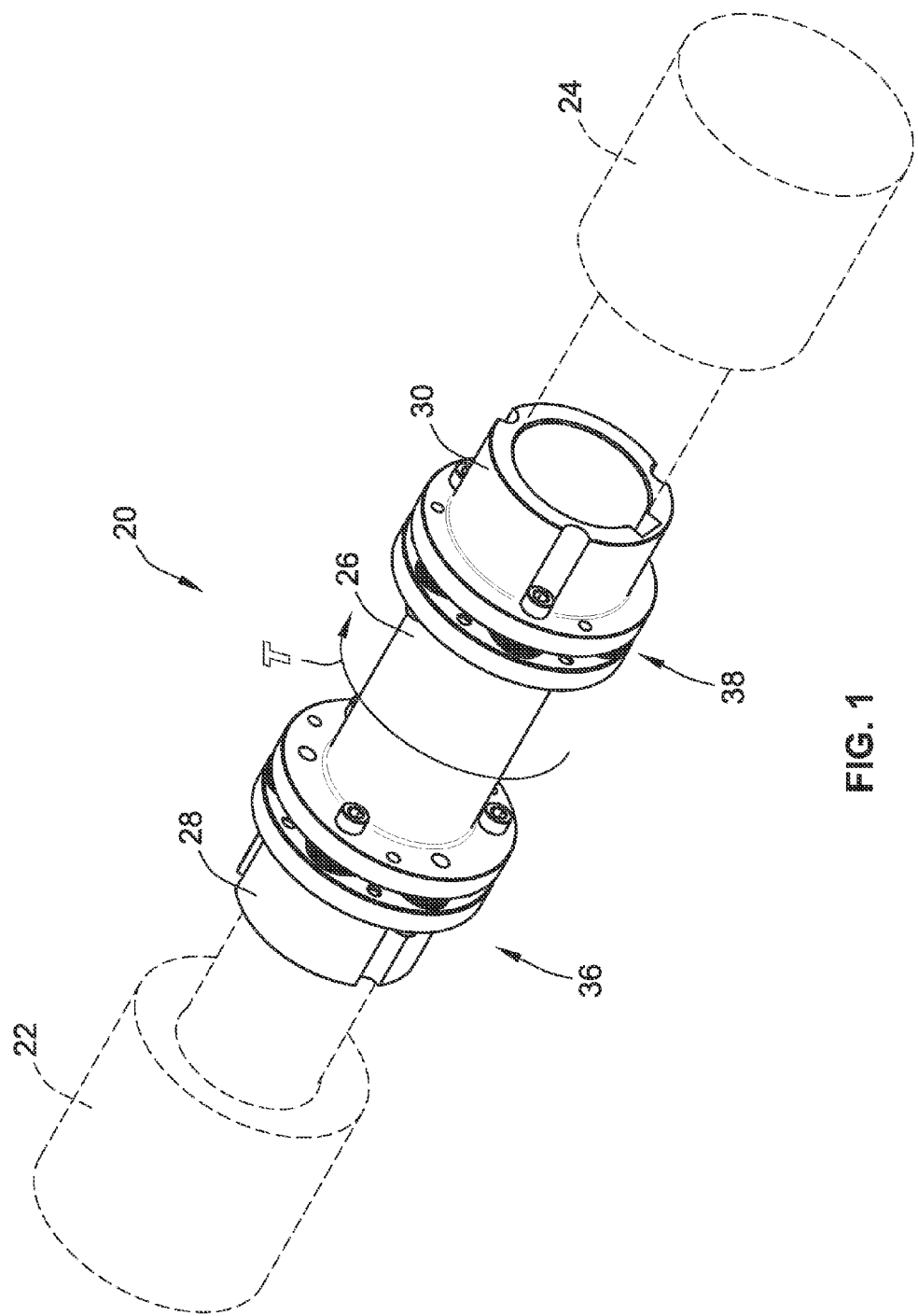
FIG. 1 is a perspective view of one embodiment of a coupling assembly according to the teachings of the present invention.

With particular reference to FIG. 1, an exemplary embodiment of a coupling assembly 20 is illustrated. Coupling assembly 20 is shown connected between a motor 22 and a gear box 24. Coupling assembly 20 transfers a rotational torque T from motor 22 to gear box 24. The assembled components of coupling assembly 20 each have a bore therethrough to define a continuous bore when assembled. A rotational element such as a shaft from each of motor 22 and gear box 24 are received within this bore. Accordingly, coupling assembly 20 includes appropriate keyways or the like for acceptance of these shafts and torque transmission. As will be readily recognized by those of skill in the art, coupling assembly 20 is not limited to any particular motor, gear box, or other componentry. As such, motor 22 and gear box 24 are shown schematically in FIG. 1. Further, while a motor 22 and gear box 24 are provided as the exemplary components between which coupling assembly 20 is situated, it will be readily recognized that coupling assembly 20 may be utilized in any application where a rotational torque is transferred from one element to another.

Coupling assembly 20 is illustrated as including a body member 26 with two end members 28, 30 attached to opposing ends of body member 26. As will be understood in greater detail from the following, although two end members 28, 30, are shown, body member 26 may connect to a single end member in other embodiments. An advantage of utilizing two end members 28, 30 and body member 26 and their associated connection arrangements 36, 38 is that such a configuration allows for a greater amount of axial, angular, and parallelism misalignment of motor 22 and gear box 24.

Each of body member 26 and end members 28, 30 are generally cylindrical in shape and each include a radially protruding flange. As can be seen from FIG. 1, in the case of body member 26, this component includes two radially protruding flanges at the opposing ends thereof. The flanges of these respective components align with one another to connect the same as shown in FIG. 1. More particularly, a first connection arrangement 36 is positioned between one of the flanges of body member 26 and end member 28. A second connection arrangement 38 is positioned between the other one of the flanges of body member 26 and end member 30. These connection arrangements 36, 38 allow for the aforementioned axial, angular, and parallelism misalignment of motor 22 and gear box 24 and also allow for the omission of the otherwise required nut associated with each fastener used to fasten the aforementioned components together.

Figure 2:
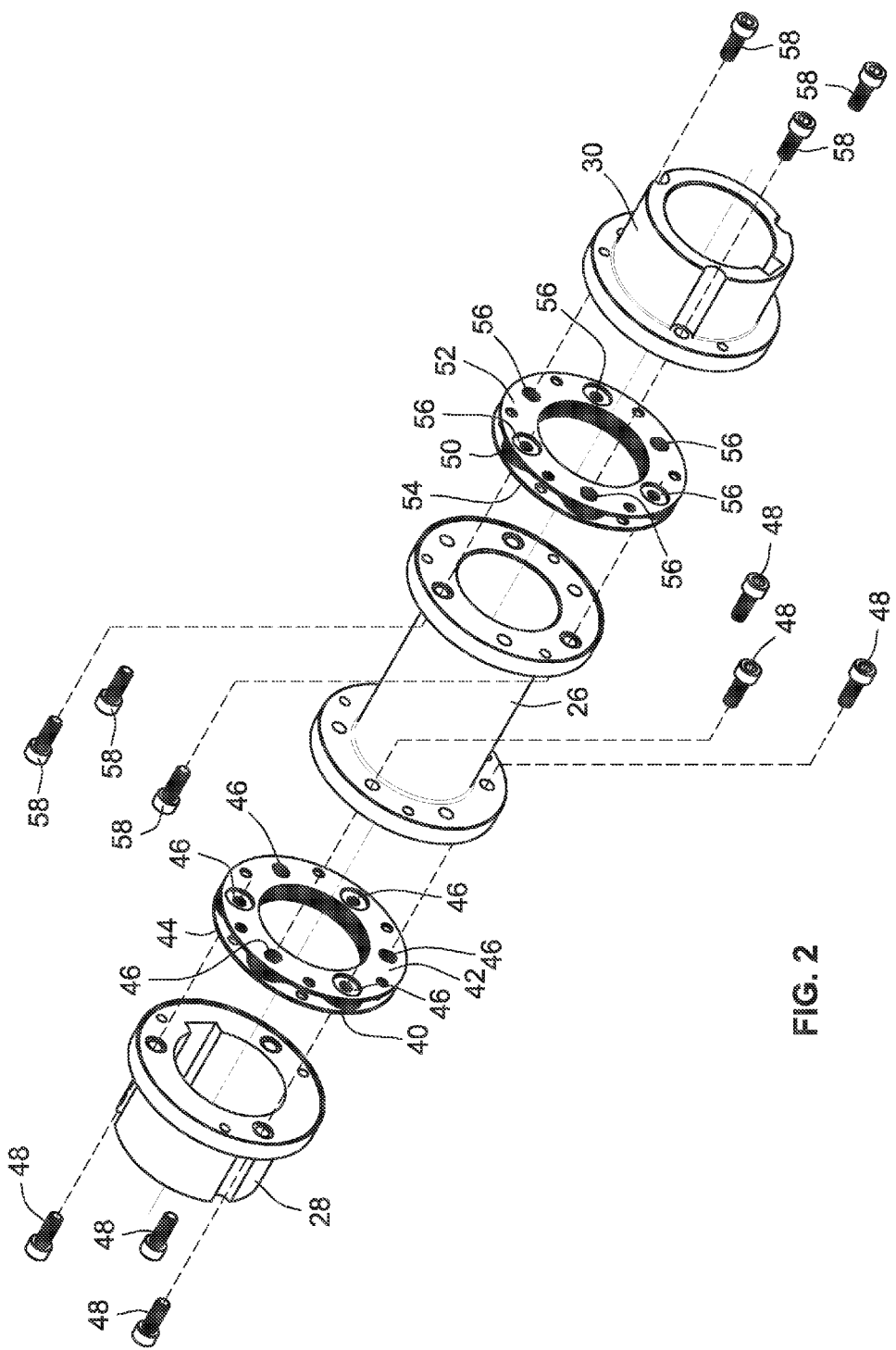
FIG. 2 is a perspective exploded view of the coupling assembly of FIG. 1.

Turning now to FIG. 2, coupling assembly 20 is shown in an exploded view. Connection arrangement 36 includes a disc pack 40 which is interposed between a pair of pilot rings 42, 44. Disc pack 40 includes a plurality of stacked thin plate-like elements. Pilot rings 42, 44 are also thin plate-like elements. A number of bushings 46 are received by disc pack 40 and pilot rings 42, 44. As will be explained in greater detail below, these bushings 46 are keyed to pilot rings 42, 44 such that they cannot rotate about their center longitudinal axes. This advantageously allows fasteners 48 to be threadably installed into bushings 46 without the bushings 46 rotating as the fastener is rotated to tighten the same.

In an identical fashion, connection arrangement 38 also includes a disc pack 50 interposed between a pair of pilot rings 52, 54. A number of bushings 56 are received in disc pack 50 and pilot rings 52, 54. These bushings 56 are keyed to pilot rings 52, 54 such that they cannot rotate as fasteners 58 are threadably installed into bushings 56.

As can also be seen in FIG. 2, connection arrangement 36 and the adjacent flanges of body member 26 define aligned passageways therethrough for the insertion of a first set of fasteners 48. Connection arrangement 36 and the flange of end member 28 also define aligned passageways therethrough for the insertion of a second set of fasteners 48. In an identical fashion, connection arrangement 38 and the adjacent flanges of body member 26 and end member 30 collectively defined aligned passageways for receiving fasteners 58. As can also be seen in FIG. 2 relative to connection arrangement 36, the first set of fasteners 48 faces in an opposite direction of the second set of fasteners 48. In other words, the first set of fasteners 48 passes through the flange of end member 28, and into connection arrangement 36. The second set of fasteners 48 passes through the flange of body member 26 adjacent connection arrangement 36 and terminates in connection arrangement 36.

Likewise, and relative to connection arrangement 38, the first set of fasteners 58 passes through end member 30 and terminates in connection arrangement 38. The second set of fasteners 58 passes through the flange of body member 26 adjacent connection arrangement 38 and terminates in connection arrangement 38.

Figure 3:
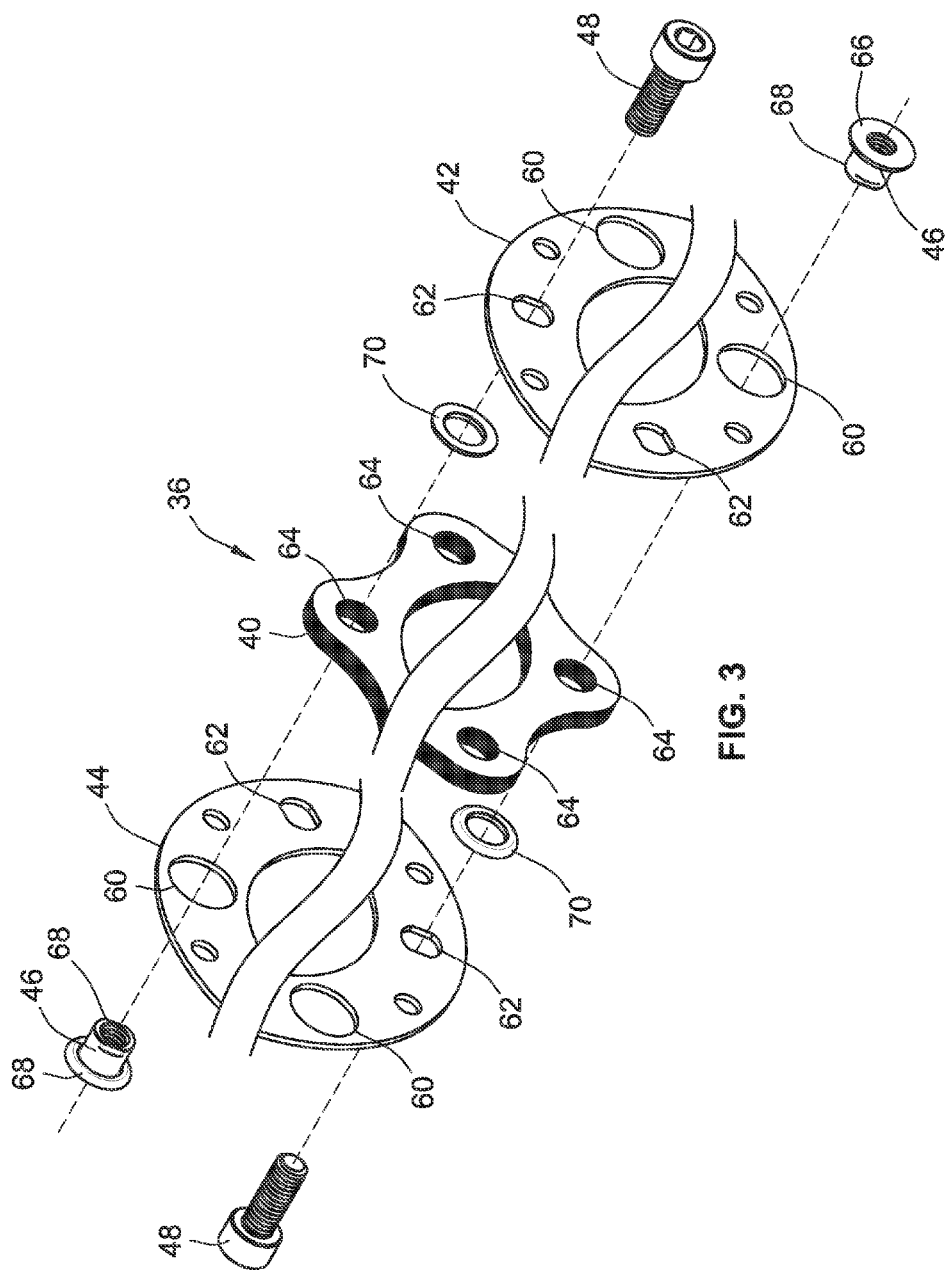
FIG. 3 is a perspective exploded view of a connection arrangement of the coupling assembly of FIG. 1.

Turning now to FIG. 3, a more detailed explanation of the aforementioned aligned passageways and interaction between the aforementioned fasteners and connection arrangement will be provided. More particularly, connection arrangement 36 is shown in an exploded view in FIG. 3 in association with fasteners 48. It will be recognized that the following description applies equally well to connection arrangement 38 given the identical design of these components.

Each pilot ring 42, 44 includes a plurality of circular apertures 60 and a plurality of non-circular apertures 62. Disc pack 40, and more particularly each of its associated rings, includes a plurality of apertures 64 which are aligned with apertures 60, 62 of pilot rings 42, 44. Each of the above-introduced bushings 46 includes a head portion 66 and a body portion 68 which has a non-circular outer periphery.

Body portion 68 of each bushing 46 passes through its associated aperture 64 until it is received by an associated non-circular aperture 62. This non-circular shape of non-circular aperture 62 and the outer periphery of body portion 68 prevents bushing 46 from rotating about its center longitudinal axis. Such a configuration prevents each bushing 46 from rotating its associated fastener 48 is threadably installed therein. As can also be seen in FIG. 3, an associated washer 70 may also be utilized between disc pack 40 and each pilot ring 42, 44 as needed.

Those of skill in the art will readily recognize that this alleviates the need to utilize a nut on the end of each fastener 48 and allows the terminal end of each fastener 48 to terminate within an interior of the aligned passageway receiving the same. In other words, the terminal end of the fastener does not protrude axially beyond the flange immediately adjacent the head portion 66 of the bushing 46 receiving that fastener.

Because there is no nut on the backside of the flange, a tool such as a wrench or socket is not required to hold such a nut in place. As a result, the above-discussed undesirable clearance required for such tools is eliminated. Therefore, the overall outer diameter of coupling assembly 20 and its associated componentry is increased. This also allows for coupling assembly 20 to have a greater bore diameter and higher torque density than prior designs. The higher bore diameter means that the coupling assembly can accept larger diameter shafts from motor 22 and gear box 24 (see FIG. 1) than prior designs. Additionally, in prior coupling designs fasteners such as bolts having highly precise dimensional tolerances are required to maintain concentricity of the assembly. On the contrary, and due to the highly precise tolerances of the bushings 46, 56 and their corresponding non-circular apertures 62, the concentricity of coupling assembly 20 is maintained in large part due to these highly precise tolerances and therefore standard fasteners such as bolts may be utilized which do not have such highly precise tolerances as those fasteners of prior designs.

Figure 4:
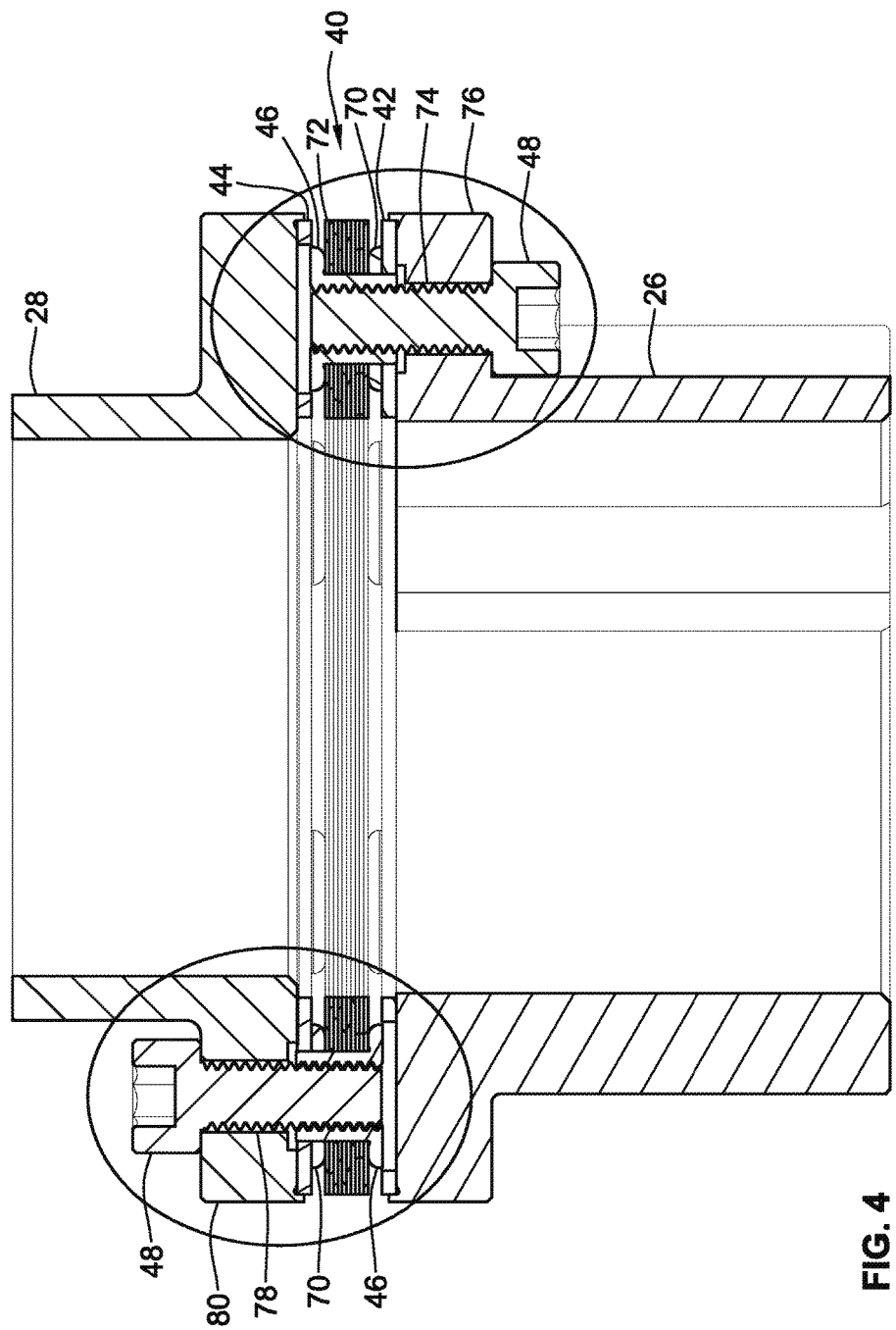
FIG. 4 is a cross section of the coupling assembly of FIG. 1.

Turning now to FIG. 4, the same illustrates a cross-section of end member 28 installed relative to body member 26 using connection arrangement 36. As can be seen in this view, fasteners 48 face in opposing directions as introduced above.

Further, each fastener 48 is received within its associated bushing 46. As can also be seen, each fastener does not protrude axially beyond the bushing 46. Rather, the terminal end of each fastener 48 terminates within the aligned passageway defined by the flange and connection arrangement shown. Due to the aforementioned opposed arrangement of fasteners 48, coupling assembly 20 allows for axial, angular, and parallelism misalignment of the center longitudinal axes of body member 26 and end members 28, 30.

Indeed, because no single fastener 48 extends through both flanges and connection arrangement 36, and because they are arranged in an opposed spaced relationship, there is a degree of shifting of the center longitudinal axis of end member 28 relative to the center longitudinal axis of body member 26. Put differently, where there is no misalignment between motor 22 and gear box 24 (See FIG. 1) the center longitudinal axes of end member 28, body member 26 and end member 30 will be coaxial with one another. However, if there is some misalignment, either one of end members 28, 30 may shift in the radial direction relative to body member 26 due to the disc pack of each connection arrangement and the aforementioned arrangement of the fasteners and bushings.

Figure 5:
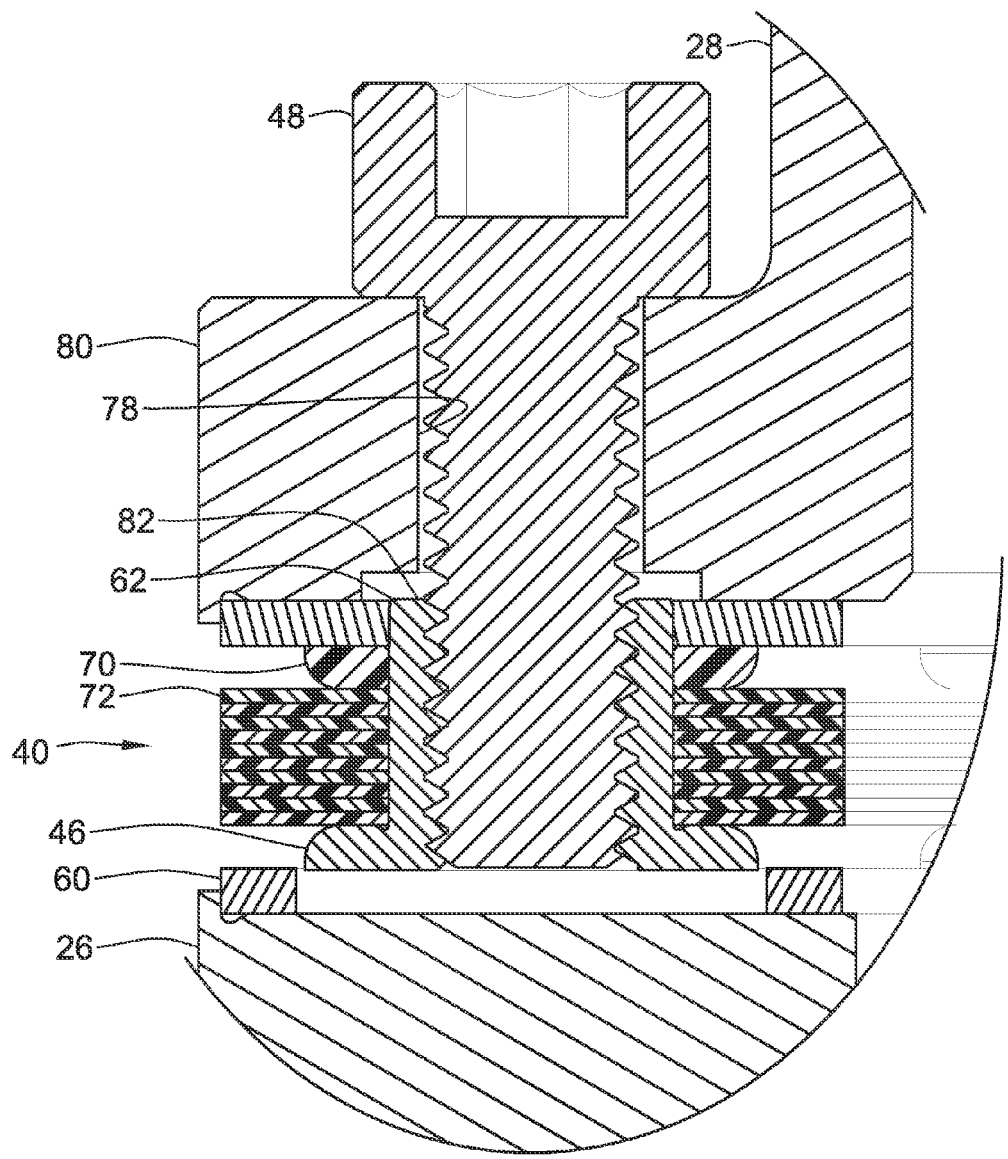
FIG. 5 is a partial view of the cross section of FIG. 4.

Turning now to FIG. 5, the same illustrates the cross-section of FIG. 4 in greater detail. As can be seen therein, disc pack 40 includes a plurality of stacked plate-like ring elements 72. Fastener 48 passes through an aperture 78 in flange 80 of end member 28. This fastener is then received in a threaded aperture 82 of bushing 46. Continued tightening of fastener 48 pulls bushing 46 axially towards disc pack 40 and washer 70 to place a compressive force against the same and fixes disc pack 40 to flange 80. Because of the opposed figuration shown in FIG. 4, the same holds true for flange 76 of body member 26 and disc pack 40. Disc pack 40 is thus a common point of connection between end member 28 and body member 26. The same holds true for end member 30, body member 26, and connection arrangement 38.

As described herein, the embodiment of coupling assembly 20 presents and advantage over existing coupling designs by providing a configuration that does not require a nut associated with each fastener used to assemble the constituent components of the coupling assembly 20. Rather, a unique anti-rotational bushing arrangement is utilized which allows the fasteners of the coupling assemble to terminate within passageways of the coupling assembly as opposed to protruding therefrom and requiring a nut to tighten the same. This advantageously increases the overall shaft diameter the coupling can accommodate and increases its torque density. Such a configuration also allows for a reduction in cost and labor to assemble the coupling assembly 20.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A coupling assembly, comprising:
   a body member, the body member including a radially protruding flange;
   at least one end member attached to the body member, the at least one end member having a radially protruding flange;
   a connection arrangement situated between the body member and the at least one end member, the connection arrangement including a plurality of bushings each having a head portion with a circular outer periphery and a body portion extending from the head portion and terminating with a non-circular outer periphery;
   a plurality of fasteners respectively received by the connection arrangement to fasten the body member to the at least one end member, the plurality of fasteners in threaded engagement with the plurality of bushings; and
   wherein the plurality of fasteners includes a first set and a second set, the first set and the second set are opposed such that the first set seats against the body member flange and the second set seats against the at least one end member flange.

2. The coupling assembly of claim 1, wherein the at least one end member includes a first and a second end member and wherein the at least one connection arrangement includes a first connection arrangement and a second connection arrangement, the first connection arrangement interposed between the fist end member and a first end of the body member, the second connection arrangement interposed between the second end member and a second end of the body member.

3. The coupling assembly of claim 2, wherein each of the first and second connection arrangements includes a disc pack interposed between a pair of pilot rings.

4. The coupling assembly of claim 3, wherein the disc pack includes a plurality of identical stacked flexible discs, wherein each one of the plurality of identical stacked flexible discs includes a hole pattern therein.

5. The coupling assembly of claim 3, wherein each one of the pair of pilot rings includes a plurality of circular apertures and a plurality of non-circular apertures formed therein.

6. The coupling assembly of claim 5, wherein the plurality of non-circular apertures of the pair of pilot rings respectively receive the body portions of the plurality of bushings of the connection arrangement.

7. The coupling assembly of claim 6, wherein the body portion of each of the plurality of bushings is respectively received in the plurality of non-circular apertures to rotationally fix each bushing about its center longitudinal axis.

8. The coupling assembly of claim 7, wherein a terminal end of each of the plurality of fasteners is disposed, respectively, within an interior passageway of each of the plurality of bushings.

9. A coupling assembly, comprising:
   a body member;
   at least one end member attached to the body member;
   at least one connection arrangement situated between the body member and the at least one end member, respectively, the at least one connection arrangement comprising a plurality of bushings, wherein each one of the plurality of bushings includes a head portion having a circular outer periphery and a body portion extending from the head portion and terminating with a non-circular outer periphery;

a plurality of fasteners which are each respectively in threaded engagement with the plurality of bushings to fasten the body member to the at least one end member;

wherein each one of the plurality of bushings are rotationally fixed about their center longitudinal axes by the at least one connection arrangement; and wherein the at least one connection arrangement includes a disc pack interposed between a pair of pilot rings;

wherein each one of the pair of pilot rings includes a plurality of circular apertures and a plurality of non-circular apertures formed therein; and wherein the plurality of non-circular apertures of the pair of pilot rings respectively receive the body portions of the plurality of bushings, such that the non-circular outer peripheries of the body portions are received in the non-circular apertures.

10. The coupling assembly of claim 9, wherein the at least one end member includes a first and a second end member and wherein the at least one connection arrangement includes a first connection arrangement and a second connection arrangement, the first connection arrangement interposed between the fist end member and a first end of the body member, the second connection arrangement interposed between the second end member and a second end of the body member.

11. The coupling assembly of claim 9, wherein the disc pack includes a plurality of identical stacked flexible discs, wherein each one of the plurality of identical stacked flexible disc includes a hole pattern therein.

12. The coupling assembly of claim 9, wherein the body portion of each of the plurality of bushings is respectively received in the plurality of non-circular apertures to rotationally fix each bushing about its center longitudinal axis.

13. The coupling assembly of claim 9, wherein the body member includes a radially protruding flange and wherein the at least one end member includes a radially protruding flange, wherein the plurality of fasteners includes first set and second set, the first set and the second set opposed such that the first set seats against the body member flange and the second set seats against the at least one end member flange.

14. The coupling assembly of claim 13, wherein a terminal end of each of the plurality of fasteners is disposed, respectively, within an interior passageway of each of the plurality of bushings.

* * * * *